Dec. 26, 1967  D. L. WEISMAN ETAL  3,360,323
TRANSVERSE MAGNETO-OPTICAL ROTATOR WITH
COMPENSATION OF PHASE RETARDATION
Filed Oct. 7, 1963
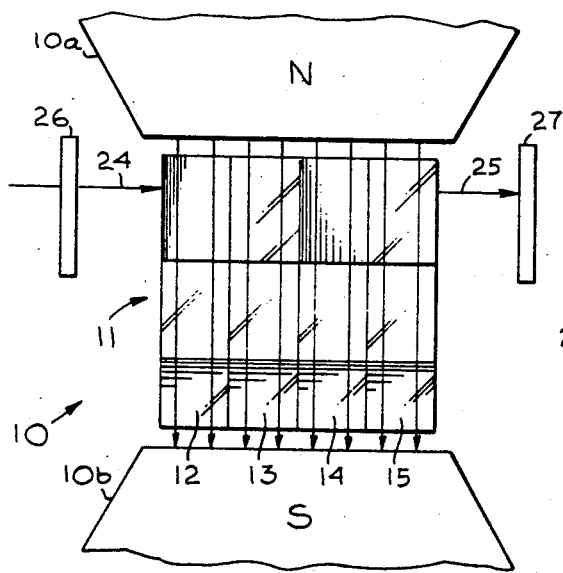
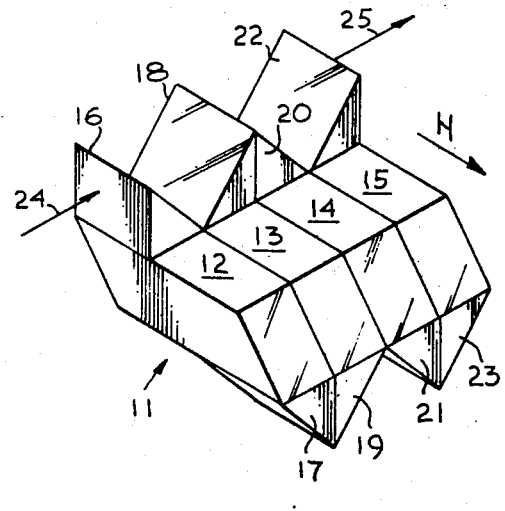
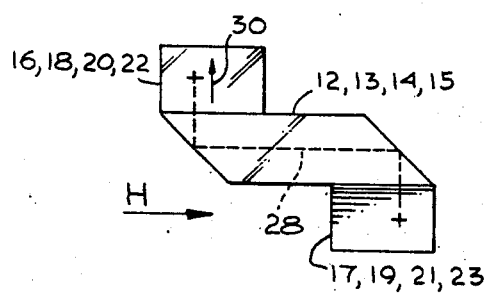
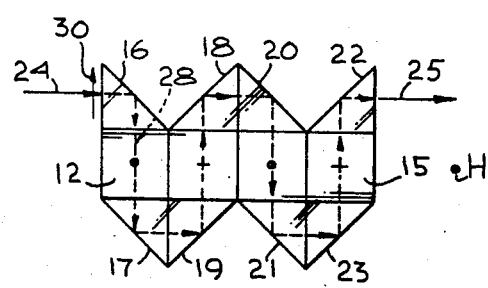
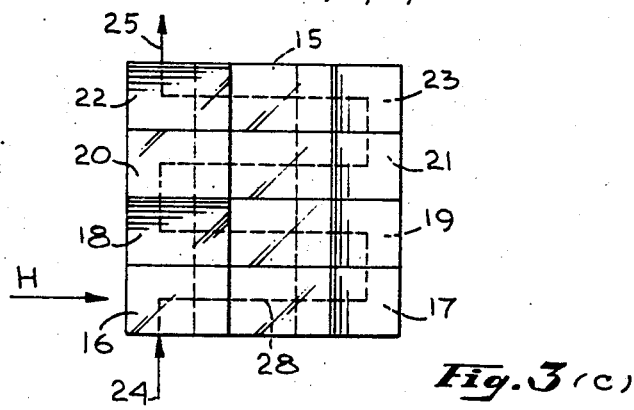
DAVID L. WEISMAN
PAUL C. FLETCHER
INVENTORS
BY Allen E. Botney
ATTORNEY

United States Patent Office 3,360,323
Patented Dec. 26, 1967

3,360,323
TRANSVERSE MAGNETO-OPTICAL ROTATOR WITH COMPENSATION OF PHASE RETARDATION
David L. Weisman, Pasadena, and Paul C. Fletcher, Altadena, Calif., assignors to Electro-Optical Systems, Inc., Pasadena, Calif., a corporation of California
Filed Oct. 7, 1963, Ser. No. 314,290
3 Claims. (Cl. 350—151)

ABSTRACT OF THE DISCLOSURE

An optical rotator apparatus where rotation of linear polarized light is produced by passage of the light ray through a high Verdet constant rhomboid parallel to a magnetic field. The elliptical polarization occurring upon reflection at the end of the rhomboid is corrected by prisms mounted on each end of the rhomboid so that the rotator may be used with a pair of polarizers as an optical isolator.

---

The present invention relates to optical apparatus in general and more particularly relates to optical rotator and isolator apparatus.

An optical rotator may, in general, be defined as a device that rotates the plane of vibration of a linearly polarized light beam. However, when the rotator is combined with an appropriate pair of polarizers, one at each end of the rotator, an optical isolator is formed which prevents light applied at the output end from being emitted at its input end and, therefore, as its name implies, it is the kind of device that isolates one piece of optical equipment from another. By using such an isolator device, parasitic oscillations may be avoided and a high degree of energy transfer achieved.

Previous devices of this kind have had the polarized light ray enter the rotator parallel to a magnetic field and have had the ray travel substantially without bending through the rotator, the plane of vibration of the polarized light being rotated under the influence of the magnetic field. This is known as the Faraday effect and the reason it found virtually no technical application in the past is the fact that substances heretofore known to be applicable as optical bodies exhibiting the Faraday effect were magnetically responsive only to a slight and insufficient degree. Consequently, these earlier rotator and isolator devices required long path length and very strong magnetic fields in order to produce any significant rotation of the plane of vibration, which has meant the use of heavy, bulky and relatively complex equipment, such as heavy electromagnetic solenoids, regulated D-C power supplies, and the like.

It is, therefore, an object of the present invention to provide an optical device which, in the presence of a magnetic field, is most effective in optically isolating two pieces of optical apparatus between which it is positioned.

It is another object of the present invention to provide an optical device that is capable of producing sizeable rotations of the plane of vibration of a polarized light beam.

It is a further object of the present invention to provide an optical device employing the Faraday effect that allows linearly polarized light rays to both enter and leave the device at right angles to the magnetic field applied to it, that is to say, without becoming elliptically polarized.

It is an additional object of the present invention to produce an optical rotator device based on the Faraday effect but which is more practical in its construction than earlier such devices.

The limitations and disadvantages mentioned above as being encountered among the prior art devices are substantially if not entirely eliminated and the above and other objects are achieved by means of the present invention, which takes a linearly polarized light wave and rotates its plane of polarization by a designed amount without introducing wave components that would convert the plane polarized wave to one that was elliptically polarized. More specifically, according to an embodiment of the invention, several rhomboid-shaped elements, some made of a material having a high Verdet constant and some of a material having a low Verdet constant, are mounted adjacent each other side by side, triangular prisms being optically coupled to these elements at their ends. This combination of rhomboid-shaped elements and prisms, when placed in a magnetic field of suitable strength, constitutes a rotator and when additionally placed between an appropriate pair of polarizers, an isolator, also according to the present invention, is thereby formed. In its operation, the beam of light enters a triangular prism from which it is reflected into the first rhomboid. Thereafter, the beam is reflected back and forth into and through successive rhomboid elements until it leaves by way of another triangular prism, each passage through a rhomboid element producing a further rotation of the plane of vibration of the light beam.

One of the advantages of the rotator (or isolator) of the present invention is that it can be placed in a magnetic field in such a manner that the beam enters and leaves transversely to the field, thereby helping to reduce the air gap between the poles of the magnet which, in turn, allows the use of lightweight permanent magnets of uniform field density. Furthermore, in any embodiment of the present invention, rotator retardations during certain reflections or due to Voight effect are exactly canceled by "advances" during other reflections, which thereby prevents elliptical polarization by reflection from resulting as in the case of other similar devices, which heretofore prevented their use unless quarter-wave plate retarders are also used between traverses.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

FIGURE 1 is an over-all top view of an optical isolator according to the present invention, the isolator including an optical rotator within it;

FIGURE 2 is a view in perspective of the optical element which, when appropriately positioned in a magnetic field, actually produces the rotation of the plane of vibration; and FIGS. 3a–3c respectively illustrate side, end and top views of the optical element in FIG. 2.

Referring now to the drawings, reference is first made to FIG. 1 wherein an optical rotator mechanism according to the present invention is shown to include a magnet, generally designated 10, between whose poles an optical element, generally designated 11, is positioned. Magnet 10 is preferably a permanent magnet but one that is capable of providing the desired field strength, for example, a field strength of several thousand gauss. The North and South Poles of magnet 10 are respectively designated 10a and 10b. Optical element 11 is made up of a plurality of glass elements, some of which are rhomboid-shaped and others of which are triangular-shaped, as is more clearly shown in FIG. 2.

More particularly, the specific optical element in FIG. 2 is shown to include a plurality of four rhomboid-shaped elements 12–15 whose ends preferably form 45° angles with the adjacent sides. Rhomboids 12–15 are preferably positioned and mounted alongside one another in a sandwich-type relationship. Also included are a plurality of 8 triangular-shaped prisms 16–23, two such prisms for each rhomboid, each pair of prisms respectively being mounted on opposite ends of its associated rhomboid and on opposite surfaces thereof. For example, with respect to prisms 16 and 17, prism 16 is mounted on one end of rhomboid 12 on its top surface and prism 17 is mounted on its other end but on the bottom surface. Each pair of the remaining prisms, namely, prisms 18–23, are likewise mounted on their rhomboids. In short, the prisms are mounted and oriented so that a beam of light, as is represented by arrow 24 in FIGS. 1 and 2, entering prism 16 will be reflected therefrom into rhomboid 12 and thereafter reflected back and forth between the surfaces of the remaining rhomboids and prisms until it leaves prism 22, arrow 25 representing the emerging beam. For this purpose, prisms 16–23 are preferably right triangles with the base angles thereof being 45° each, that is to say, they are isosceles right triangles. Optical element 11, described above is positioned between the poles of magnet 10 and oriented in such a way that the longitudinal axes of rhomboids 12–15 are aligned with or, stated differently, parallel to the magnetic flux, as is clearly illustrated in FIG. 1. Furthermore, the above-described four groups of rhomboid and prism elements are alternately of a high Verdet constant and of a low Verdet constant, Verdet constant being defined as a measure of the number of degrees of arc through which a beam is rotated in traveling a distance of one centimeter in a one gauss field. Thus, the combination of rhomboid 12 and prisms 16 and 17 as well as the combination of rhomboid 14 and primsms 20 and 21 are preferably made of materials having a high Verdet constant, whereas the combination of rhomboid 13 and prisms 18 and 19 as well as the combination of rhomboid 15 and prisms 22 and 23 are preferably made of materials having a low Verdet constant.

Finally, the apparatus of FIG. 1 is shown to include a pair of polarizers 26 and 27 positioned alongside and in face-to-face relationship with prisms 16 and 22. In other words, polarizers 26 and 27 are positioned so that a beam of light entering optical element 11 first passes through polarizer 26 and is projected against polarizer 27 upon emerging from this optical element.

Considering the operation in general terms, a beam of light passing through polarizer 26 enters prism 16 transversely to the magnetic field of magnet 10. This beam is reflected by the hypotenuse surface of prism 16 down and into rhomboid 12 wherein the beam is once again reflected by the end surface of the rhomboid. The beam then travels longitudinally through rhomboid 12, parallel to the magnetic field, to its other end surface where the beam is reflected once again, this time down into prism 17. In prism 17, the beam is reflected by the hypotenuse surface of the prism into adjacent prism 19 wherein the beam is again reflected, this time into rhomboid 13. It is thus seen that as a result of the configurations and arrangements of the elements of optical element 11, the beam of light is reflected back and forth until it emerges from the optical element at prism 22, the plane of vibration of the light having been rotated through a predetermined angle as a result of its passage through the optical element. The beam of light then passes through polarizer 27. For reasons that will be provided below, the emerging beam remains linearly polarized rather than elliptically polarized as oftentimes happened in the prior art, which is one of the results sought to be achieved by the present invention.

For a more detailed consideration of the operation, reference is made to FIGS. 3a–3c wherein the side, front and top views of optical rotator 11 are respectively presented, the direction of the magnetic field being indicated in each figure by the arrow marked "H." In FIG. 3b, however, the arrow is pointing out of the drawing toward the viewer and, therefore, the field is represented by a dot marked "H" instead. In this same vein, the broken line 28 in these figures indicates the path traversed by the light beam. Furthermore, in order that the features of the invention be readily and clearly understood, it is deemed necessary at this point to make certain assumptions and set down certain propositions and definitions as follows:

(1) For sake of simplicity, it will be assumed that the plane of vibration of the entering light beam is such that the vibration vector, designated 30 in FIGS. 3a and 3b, is vertically upward;

(2) A plane of incidence at a reflecting plane or surface is defined as and shall be understood to mean the plane formed by the normal to the reflecting surface and the light ray or beam;

(3) If the light is traveling in a direction that is parallel to the magnetic field, the vibration vector is rotated in a clockwise direction;

(4) For total internal reflection at an angle of 45°, if the vibration vector has a component that is perpendicular to the plane of incidence as defined above, that component continues to point in the same direction after reflection, that is to say, it remains perpendicular to the plane of incidence; and (5) For total internal reflection, if the vibration vector has a component that is parallel to the plane of incidence, that component remains parallel to the plane of incidence after reflection but is rotated 90° in a clockwise direction.

Accordingly, the light emerging from polarizer 26 is linearly polarized with its plane of vibration being such that vibration vector 30 points vertically upward in the drawing. Consequently, vector 30 is parallel to the plane of incidence at the reflecting surface of prism 16, which means that upon reflection vector 30 experiences a 90° rotation to the right, that is to say, in a clockwise direction. Thus, by way of illustration, after reflection, vibration vector 30 points in the same direction as arrow 24 in FIGS. 2 and 3b rather than vertically upwards as before reflection.

The ray of light is then directed against and reflected from that end surface of rhomboid 12 that is beneath prism 16. However, in this case, the vibration vector is perpendicular to the reflecting surface's plane of incidence and, therefore, it remains pointed in the same direction after reflection as it was before reflection. The ray of light next travels down the full length of rhomboid 12 to strike its other end surface, from which it is reflected into prism 17. In accordance with the rules previously set forth, since the ray of light traveled through rhomboid 12 in a direction that was parallel to the magnetic field, the plane of vibration and, therefore, vibration vector 30, is further rotated in a clockwise direction. As a result, at the second reflecting surface of rhomboid 12, vibration vector 30 comprises two components, a large component that is perpendicular to the plane of incidence and a small component that is parallel to it, the two components being in phase with each other timewise. Following reflection, the large component vector remains perpendicular to the plane of incidence and the small component vector experiences a 90° clockwise rotation in the plane or in a plane parallel to the plane of incidence. In addition, however, the small component also experiences a phase delay or retardation relative to the large component, with the result that the light, after it is reflected from the rhomboid surface, is elliptically polarized.

As previously mentioned, the light then enters prism 17 wherein it is reflected into prism 19. In prism 17, however, the large component of vector 30 is parallel to the plane of incidence thereof and the small component is perpendicular to it instead. Consequently, upon the light being reflected from the prism 17 surface, the large component suffers an exactly equal phase delay or retardation relative to the small component. Accordingly, the light leaving prism 17 and entering prism 19 is again linearly polarized. It will be noted that the light travels transversely or perpendicularly to the magnetic field in going from prism 17 to prism 19 and, therefore, is unaffected by it.

The phenomena just described in connection with the passage of light through prism 16, rhomboid 12 and prism 17 occurs again when the light passes through the remaining combinations of rhomboids and prisms. For example, in passing through prism 19, rhomboid 13 and prism 18, the components of vibration vector 30 again experience shifts both in space and in time but, nevertheless, for the reasons previously explained, the light is again linearly polarized when it leaves prism 18 and enters prism 20. Hence, when the light ray ultimately leaves optical element 11, as indicated by arrow 25, the light thus emerging is likewise linearly polarized but its plane of vibration has been rotated through a desired number of degrees. The light then passes through polarizer 27.

Isolation is achieved with the aid of polarizers 26 and 27 because light passing backwards through optical element 11 will have its plane of vibration further rotated by a like number of degrees, with the result that this light will fail to pass through polarizer 26. For example, if the plane of vibration of light passing through the optical element in a forward direction is rotated through an angle of 45°, the same light passing through the optical element in the reverse direction will have its plane of vibration rotated through another 45°, with the result that when the light returns to polarizer 26 it will be cross-polarized to it and, therefore, will be prevented from passing through.

Although a particular arrangement of the invention has been illustrated and described above by way of example, it is not intended that the invention be limited thereto. Thus, fewer or greater numbers of rhomboids and associated prisms may be used, depending upon the number of degrees of rotation desired for the plane of vibration. Furthermore, as will be recognized by those skilled in the art, the apparatus may be easily adapted to provide an optical circulator. Accordingly, the invention should be considered to include any and all modifications, alterations or equivalent arrangements falling within the scope of the annexed claims.

Having thus described the invention, what is claimed is:

1. A non-ellipticizing optical rotator comprising: a rhomboid-shaped element, made of a material exhibiting the Faraday effect, that reflects light incident on either end surface thereof 90° to its other end surface along a path that is parallel to its longitudinal axis; means for producing a magnetic field through said rhomboid-shaped element parallel to the longitudinal axis thereof to rotate the plane of polarization of light travelling along said axis; and first and second triangular-shaped prisms respectively mounted on the ends of said element on opposite surfaces thereof, said first prism being mounted so that a ray of light entering it transversely to the magnetic field is reflected 90° in a plane perpendicular to the magnetic field from a surface thereof to said one end surface of said rhomboid-shaped element, said second prism being mounted so that a ray of light reflected from the other end surface of said rhomboid-shaped element is reflected 90° out of said second prism transversely to said magnetic field, each of said prisms imparting the same phase retardation to light polarized in the plane of reflection as the end surfaces of the rhomboid-shaped element.

2. An optical rotator comprising: a pair of rhomboid-shaped optical elements mounted adjacent each other, side by side, with their end surfaces being in the same planes, one element being made of a material having a high Verdet constant and the other element being made of a material having a low Verdet constant; means for producing a uniform magnetic field through said elements parallel to the longitudinal axes thereof; first and second optical prisms made of a material having said high Verdet constant mounted on said one rhomboid-shaped element at opposite ends and on opposite sides thereof, said prisms being shaped and oriented so that a ray of light can respectively enter and leave said first and second prisms transversely to said magnetic field and pass through said one rhomboid-shaped element therebetween parallel to said magnetic field; and third and fourth optical prisms made of a material having said low Verdet constant mounted on said other rhomboid-shaped element at opposite ends and on opposite sides thereof, said prisms being shaped and oriented so that a ray of light leaving said second prism can respectively enter and leave said third and fourth prisms transversely to said magnetic field and pass through said other rhomboid-shaped element therebetween parallel to said magnetic field.

3. An optical rotator comprising: a plurality of rhomboid-shaped optical elements mounted adjacent one another, side by side, in a sandwich-type arrangement with their end surfaces respectively forming two planes, said elements alternately being made of light-transmitting materials having high and low Verdet constants; means for producing a uniform magnetic field through said elements parallel to the longitudinal axes thereof; a pair of triangular-shaped optical prisms mounted on each rhomboid-shaped element at opposite ends and on opposite sides thereof, each pair of prisms being made of a material having the same Verdet constant as the material of the rhomboid-shaped element on which it is mounted, said prisms being oriented so that a ray of light will pass through said prisms transversely to said magnetic field and will pass through said elements parallel to said magnetic field.

References Cited

UNITED STATES PATENTS

| 1,961,706 | 6/1934 | Pajes | 88—61 |
| 2,005,014 | 6/1935 | Tondreau | 88—33 X |

DAVID H. RUBIN, *Primary Examiner.*

JEWELL H. PEDERSEN, *Examiner.*

P. R. MILLER, *Assistant Examiner.*